(12) United States Patent
Snow et al.

(10) Patent No.: US 11,501,890 B2
(45) Date of Patent: Nov. 15, 2022

(54) METHODS OF PRODUCING ENRICHED SCANDIUM-47, AND RELATED SYSTEMS AND APPARATUSES

(71) Applicant: Battelle Energy Alliance, LLC, Idaho Falls, ID (US)

(72) Inventors: Mathew S. Snow, Idaho Falls, ID (US); Mathew T. Kinlaw, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 0 days.

(21) Appl. No.: 17/594,995

(22) PCT Filed: May 5, 2020

(86) PCT No.: PCT/US2020/031422
§ 371 (c)(1),
(2) Date: Nov. 4, 2021

(87) PCT Pub. No.: WO2020/236424
PCT Pub. Date: Nov. 26, 2020

(65) Prior Publication Data
US 2022/0148752 A1    May 12, 2022

Related U.S. Application Data

(60) Provisional application No. 62/849,724, filed on May 17, 2019.

(51) Int. Cl.
*G21G 1/04* (2006.01)
*C22B 3/06* (2006.01)
*C22B 59/00* (2006.01)
*G21G 1/00* (2006.01)

(52) U.S. Cl.
CPC .............. *G21G 1/04* (2013.01); *C22B 3/065* (2013.01); *C22B 59/00* (2013.01); *G21G 2001/0094* (2013.01)

(58) Field of Classification Search
CPC .............. G21G 1/04; C22B 3/65; C22B 59/00
See application file for complete search history.

(56) References Cited

U.S. PATENT DOCUMENTS

2013/0163707 A1    6/2013  Habs et al.

OTHER PUBLICATIONS

International Search Report from International Application No. PCT/US2020/031422, dated Aug. 6, 2020, 2 pages.
International Written Opinion from International Application No. PCT/US2020/031422, dated Aug. 6, 2020, 4 pages.

*Primary Examiner* — Melissa S Swain
(74) *Attorney, Agent, or Firm* — TraskBritt (57) ABSTRACT

A method of producing enriched $^{47}$Sc comprises irradiating a V structure comprising $^{51}$V with at least one incident photon beam having an endpoint energy within a range of from about 14 MeV to about 44 MeV to convert at least some of the $^{51}$V to $^{47}$Sc and form a $^{47}$Sc-containing structure. The $^{47}$Sc of the $^{47}$Sc-containing structure is separated from additional components of the $^{47}$Sc-containing structure using a chromatography process. Systems and apparatuses for producing enriched $^{47}$Sc are also described.

12 Claims, 7 Drawing Sheets

METHODS OF PRODUCING ENRICHED SCANDIUM-47, AND RELATED SYSTEMS AND APPARATUSES

CROSS-REFERENCE TO RELATED APPLICATIONS

This application is a national phase entry under 35 U.S.C. § 371 of International Patent Application PCT/US2020/031422, filed May 5, 2020, designating the United States of America and published as International Patent Publication WO 2020/236424 A1 on Nov. 26, 2020, which claims the benefit under Article 8 of the Patent Cooperation Treaty to U.S. Patent Application Ser. No. 62/849,724, filed May 17, 2019, for "Methods of Producing Enriched Scandium-47, and Related Systems and Apparatuses," the entire contents and disclosure of both of which are hereby incorporated herein by this reference.

STATEMENT REGARDING FEDERALLY SPONSORED RESEARCH OR DEVELOPMENT

This invention was made with government support under Contract Number DE-AC07-05ID14517 awarded by the United States Department of Energy. The government has certain rights in the invention.

TECHNICAL FIELD

The disclosure, in various embodiments, relates to methods of producing enriched scandium-47 ($^{47}$Sc), as well as related systems and apparatuses.

BACKGROUND

In recent years, nuclear medicine has sought to combine non-invasive imaging with individual, radiation-based treatment. Of particular interest in this area of theragnostics are "matched pairs," or a combination of diagnostic or therapeutic radioisotopes that exploit the same molecular targeting vectors. To date, only a few matching isotopes have been shown to have promise. Of those identified, $^{47}$Sc has received significant interest based on its half-life (3.97 hours), well-suited gamma-ray emission (159 keV, 68% intensity), and 100% $\beta^-$ emission (162 keV). To date, production pathways have focused primarily on neutron-based reactions, which require access to high-flux, fast reactors and isotopically-purified calcium (Ca) or titanium (Ti) targets. In the absence of these relatively expensive, purified targets, the resulting reaction products conventionally include unacceptable quantities of long-lived chemical species such as scandium-46 ($^{46}$Sc).

It would be desirable to have new methods, systems, and apparatuses for producing enriched $^{47}$Sc. It would further be desirable if the new methods, systems, and apparatuses minimized the production of undesirable chemical species, such as $^{46}$Sc; facilitated relatively high $^{47}$Sc yield and purity; and were relatively simple and inexpensive.

BRIEF SUMMARY

Embodiments described herein include methods of producing enriched $^{47}$Sc, as well as related systems and apparatuses. In some embodiments, a method of producing enriched $^{47}$Sc comprises irradiating a vanadium (V) structure comprising vanadium-51 ($^{51}$V) with at least one incident photon beam having an endpoint energy within a range of from about 14 MeV to about 44 MeV to convert at least some of the $^{51}$V to $^{47}$Sc and form a $^{47}$Sc-containing structure. The $^{47}$Sc of the $^{47}$Sc-containing structure is separated from additional components of the $^{47}$Sc-containing structure using a chromatography process.

In additional embodiments, a system for producing enriched $^{47}$Sc comprises an irradiation apparatus, a V structure, a dissolution apparatus, and a separation apparatus. The irradiation apparatus comprises an electron accelerator configured to generate an electron beam having a nominal energy level less than or equal to about 44 MeV, and a photon generator configured and positioned to receive the electron beam and to generate an incident proton beam having an endpoint energy substantially equal to the nominal energy level of the electron beam. The V structure is configured and positioned to receive the incident proton beam to produce a $^{47}$Sc-containing structure through $^{51}$V($\gamma$,$\alpha$)$^{47}$Sc reactions. The dissolution apparatus is configured and positioned to receive and interact the $^{47}$Sc-containing structure with one or more solvents formulated to dissolve the $^{47}$Sc-containing structure to form a $^{47}$Sc-containing solution. The separation apparatus is configured and positioned to receive the $^{47}$Sc-containing solution and to substantially separate $^{47}$Sc of the $^{47}$Sc-containing solution from other components of the $^{47}$Sc-containing solution.

In further embodiments, an apparatus comprises an electron accelerator, a photon generator, and a V structure. The electron accelerator is configured to generate an electron beam having a nominal energy level less than or equal to about 44 MeV. The photon generator comprises an electron deceleration structure configured and positioned to receive the electron beam and to generate an incident bremsstrahlung proton beam having an endpoint energy within a range of from about 14 MeV to about 44 MeV. The V structure is configured and positioned to receive the incident bremsstrahlung proton beam and to produce a $^{47}$Sc-containing structure through $^{51}$V($\gamma$,$\alpha$)$^{47}$Sc reactions.

DETAILED DESCRIPTION

The following description provides specific details, such as material compositions and processing conditions (e.g., temperatures, pressures, flow rates, etc.) in order to provide a thorough description of embodiments of the disclosure. However, a person of ordinary skill in the art will understand that the embodiments of the disclosure may be practiced without necessarily employing these specific details. Indeed, the embodiments of the disclosure may be practiced in conjunction with conventional systems and methods employed in the industry. In addition, only those process components and acts necessary to understand the embodiments of the present disclosure are described in detail below. A person of ordinary skill in the art will understand that some process components (e.g., pipelines, line filters, valves, temperature detectors, flow detectors, pressure detectors, and the like) are inherently disclosed herein and that adding various conventional process components and acts would be in accord with the disclosure. In addition, the drawings accompanying the application are for illustrative purposes only, and are not meant to be actual views of any particular material, device, or system.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof. As used herein, the term "may" with respect to a material, structure, feature or method act indicates that such is contemplated for use in implementation of embodiments of the disclosure and such term is used in preference to the more restrictive term "is" so as to avoid any implication that other, compatible materials, structures, features and methods usable in combination therewith should, or must be, excluded.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures. For example, if materials in the figures are inverted, elements described as "below" or "beneath" or "under" or "on bottom of" other elements or features would then be oriented "above" or "on top of" the other elements or features. Thus, the term "below" can encompass both an orientation of above and below, depending on the context in which the term is used, which will be evident to one of ordinary skill in the art. The materials may be otherwise oriented (e.g., rotated 90 degrees, inverted, flipped) and the spatially relative descriptors used herein interpreted accordingly.

As used herein, the singular forms "a," "an," and "the" are intended to include the plural forms as well, unless the context clearly indicates otherwise.

As used herein, "and/or" includes any and all combinations of one or more of the associated listed items.

As used herein, the term "configured" refers to a size, shape, material composition, material distribution, orientation, and arrangement of one or more of at least one structure and at least one apparatus facilitating operation of one or more of the structure and the apparatus in a pre-determined way.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, at least 99.9% met, or even 100.0% met.

As used herein, "about" or "approximately" in reference to a numerical value for a particular parameter is inclusive of the numerical value and a degree of variance from the numerical value that one of ordinary skill in the art would understand is within acceptable tolerances for the particular parameter. For example, "about" or "approximately" in reference to a numerical value may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

Figure 1:
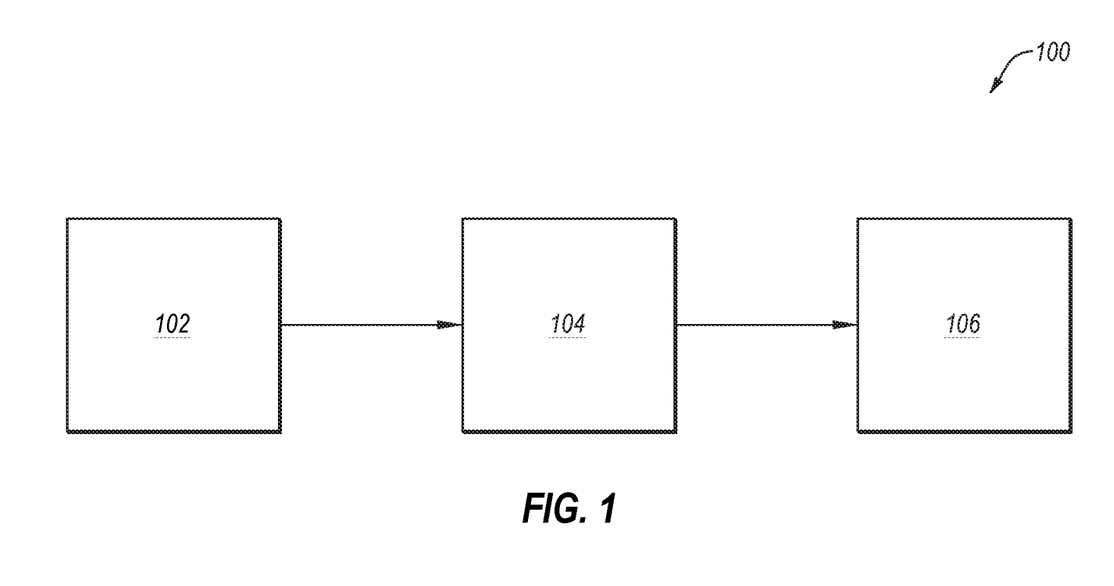
FIG. 1 is a schematic block diagram illustrating an enriched $^{47}$Sc production system, in accordance with an embodiment of the disclosure.

An embodiment of the disclosure will now be described with reference to FIG. 1, which schematically illustrates an enriched $^{47}$Sc production system 100. As shown in FIG. 1, the enriched $^{47}$Sc production system 100 may include at least one irradiation apparatus 102, at least one dissolution apparatus 104, and at least one separation apparatus 106. The irradiation apparatus 102 is configured to irradiate at least one vanadium (V) structure (e.g., V target) with generated bremsstrahlung photons to convert the V structure into a $^{47}$Sc-containing structure. The dissolution apparatus 104 is configured to receive the $^{47}$Sc-containing structure and to dissolve the $^{47}$Sc-containing structure with one or more solvents (e.g., mineral acids) to form a $^{47}$Sc-containing solution. The separation apparatus 106 is configured to receive the $^{47}$Sc-containing solution and to substantially separate (e.g., isolate) the $^{47}$Sc of the $^{47}$Sc-containing solution from the other components of the $^{47}$Sc-containing solution. With the description provided below, it will be readily apparent to one of ordinary skill in the art that the systems and methods described herein may be used in various systems. In other words, the methods and systems of the disclosure may be used whenever it is desired to produce and isolate $^{47}$SC.

Figure 2:
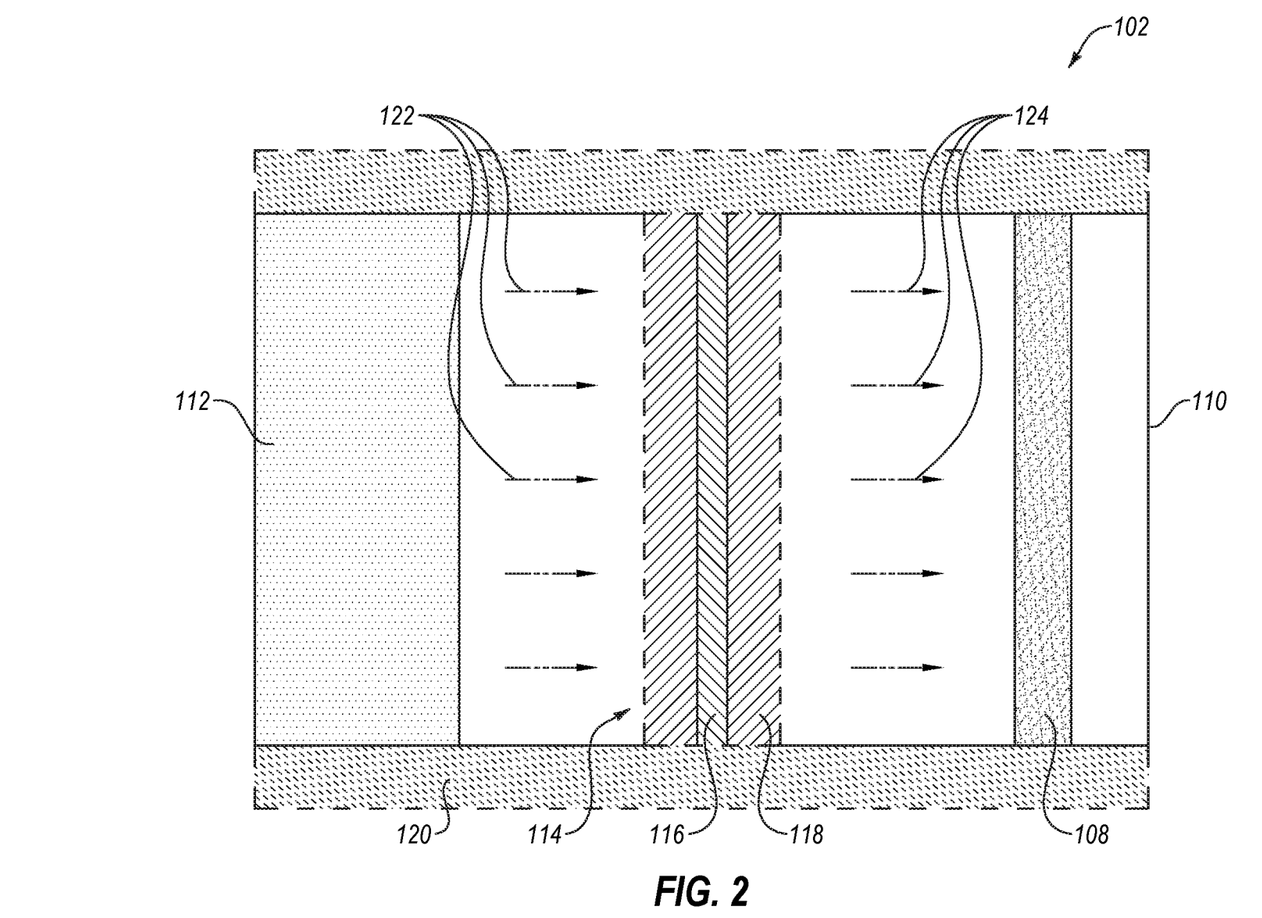
FIG. 2 is a simplified, cross-sectional view of an irradiation apparatus of the enriched $^{47}$Sc production system shown in FIG. 1, in accordance with an embodiment of the disclosure.

FIG. 2 is a simplified, cross-sectional view of the irradiation apparatus 102 of the enriched $^{47}$Sc production system 100 (FIG. 1), in accordance with embodiments of the disclosure. As shown in FIG. 2, the irradiation apparatus 102 is configured to receive and temporarily hold at least one V structure 108, and includes a housing structure 110, at least one electron accelerator 112 (e.g., electron acceleration device), at least one photon generator 114 (e.g., photon generation device), and, optionally, at least one cooling device 120.

The V structure 108 may comprise at least one structure formed of and including vanadium-51 ($^{51}$V). The V structure 108 may be substantially free of materials other than $^{51}$V. In some embodiments, the V structure 108 comprises at least 99.75 percent by weight (wt %)$^{51}$V. The V structure 108 may exhibit any desired geometric configuration (e.g., dimensions, shape) compatible with the configurations of the components of the irradiation apparatus 102. As shown in FIG. 2, the V structure 108 may be sized and shaped to be received and held within the housing structure 110 of the irradiation apparatus 102. In some embodiments, the V structure 108 comprises at least one $^{51}$V foil structure. A single (e.g., only one) V structure 108 may be provided within the irradiation apparatus 102, or multiple (e.g., more than one) V structures 108 may be provided within the irradiation apparatus 102. If multiple V structures 108 are provided in the irradiation apparatus 102, each of the V structures 108 may exhibit substantially the same configuration (e.g., substantially the same dimensions, substantially the same shape, substantially the same orientation, etc.) as each other of the V structures 108, and may be spaced apart from each other of the V structures 108 by substantially the same distance; or one or more of the V structures 108 may exhibit a different configuration (e.g., one or more different dimensions, a different shape, a different orientation, etc.) than one or more other of the V structures 108, or may be may be spaced apart from two of more other of the V structures 108 by different distances.

With continued reference to FIG. 2, the housing structure 110 of the irradiation apparatus 102 may exhibit any shape (e.g., a tubular shape, a quadrilateral shape, a spherical shape, a semi-spherical shape, a cylindrical shape, a semi-cylindrical shape, truncated versions thereof, or an irregular shape) and size able to contain (e.g., hold) at least the photon generator 114 and the V structure 108 therein. In addition, the housing structure 110 may be formed of and include any material (e.g., metal, alloy, ceramic, composite, glass, polymer, combination thereof, etc.) compatible with the operating conditions of the irradiation apparatus 102.

The electron accelerator 112 of the irradiation apparatus 102 may comprise at least one device configured to accelerate electrons to generate at least one electron beam having a nominal electron energy that does not substantially effectuate the formation of scandium 46 ($^{46}$Sc)) and scandium-48 ($^{46}$Sc) from $^{51}$V through reactions with bremsstrahlung photons generated by the photon generator 114 (described in further detail below). By way of non-limiting example, the electron accelerator 112 may be configured to accelerate electrons to energy levels within a range of from about 14 megaelectronvolts (MeV) to about 44 MeV (e.g., from about 14 MeV to about 34 MeV, from about 14 MeV to about 26 MeV, from about 14 MeV to about 25.5 MeV, from about 14 MeV to about 25 MeV, or from about 14 MeV to about 24.5 MeV). In some embodiment, the electron accelerator 112 is configured and operated to accelerate electrons to energy levels within a range of from about 14 MeV to about 26 MeV. The electron beam(s) generated by the electron accelerator 112 may have a distribution of electron energies favoring the production of $^{47}$Sc and substantially disfavoring the production of $^{46}$Sc and $^{48}$Sc from $^{51}$V through the reactions with the bremsstrahlung photons generated using the electron beam(s). Substantially all of the accelerated electrons of the electron beam(s) may have energies greater than or equal to a reaction threshold energy (10.293 MeV, according to quality factor (Q)-value calculations provided by the National Nuclear Data Center (NNDC) of Upton, N.Y.) for the production of $^{47}$Sc from $^{51}$V through reactions with the bremsstrahlung photons generated using the electron beam(s); and most (e.g., substantially all) of the accelerated electrons of the of the electron beam(s) may have energies less than reaction threshold energies (20.943 MeV and 22.637 MeV, respectively, according to Q-value calculations provided by the NNDC of Upton, N.Y.) for the production of $^{46}$Sc and $^{48}$Sc from $^{51}$V through reactions with the bremsstrahlung photons generated using the electron beam(s). For electron beams having a nominal electron energy less than or equal to 26 MeV (e.g., less than or equal to 25.5 MeV, less than or equal to 25 MeV, or less than or equal to 24.5 MeV) the probably of $^{46}$Sc and $^{48}$Sc production through reactions between $^{51}$V through reactions with the bremsstrahlung photons generated using the electron beam(s) is extremely low (e.g., essentially zero). In additional embodiments, electron beams having a nominal electronic energy greater than 26 MeV (e.g., greater than 26 MeV and less than or equal to 44 MeV) are employed to relatively increase (e.g., maximize)$^{47}$Sc production even if employing such electron beams also relatively increases $^{46}$Sc production and/or $^{48}$Sc production. In some embodiments, the electron accelerator 112 comprises a linear particle accelerator (commonly referred to as a "linac").

The electron deceleration structure 116 of the photon generator 114 is configured and positioned to deflect and decelerate the accelerated electrons exiting the electron accelerator 112. As the accelerated electrons decelerate they lose kinetic energy, which is converted into radiation in the form of bremsstrahlung photons. The electron deceleration structure 116 may have any material composition facilitating the generation of bremsstrahlung photons by the deceleration of the accelerated electrons. By way of non-limiting example, the electron deceleration structure 116 may be formed of and include one or more of tungsten (W), tantalum (Ta), and copper (Cu). In some embodiments, the electron deceleration structure 116 is formed of and includes W. In addition, the electron deceleration structure 116 may exhibit any desired geometric configuration (e.g., dimensions, shape) compatible with the configurations of the other components of the irradiation apparatus 102. As shown in FIG. 2, the electron deceleration structure 116 may be sized and shaped to be received and held within the housing structure 110 of the irradiation apparatus 102. In some embodiments, the electron deceleration structure 116 comprises at least one foil structure. A single (e.g., only one) electron deceleration structure 116 may be provided within the housing structure 110, or multiple (e.g., more than one) electron deceleration structure 116 may be provided within the housing structure 110. If multiple electron deceleration structures 116 structures are provided in the housing structure 110, each of the electron deceleration structures 116 may exhibit substantially the same configuration (e.g., substantially the same material composition, substantially the same dimensions, substantially the same shape, substantially the same orientation, etc.) as each other of the electron deceleration structures 116, and may be spaced apart from each other of the electron deceleration structures 116 by substantially the same distance; or one or more of the electron deceleration structures 116 may exhibit a different configuration (e.g., a different material composition, one or more different dimensions, a different shape, a different orientation, etc.) than one or more other of the electron deceleration structures 116, or may be may be spaced apart from two of more other of the electron deceleration structures 116 by different distances.

If present, the electron filter structure 118 is configured and positioned to absorb electrons. The electron filter structure 118 may substantially impede (e.g., substantially prevent) electrons travelling past beyond boundaries of the electron deceleration structure 116 from undesirably interacting with (e.g., being absorbed by) the V structure 108. Substantially impeding electrons from traveling to and interacting with the V structure 108 may, for example, mitigate (e.g., prevent) excessive heating of the V structure 108 that may otherwise undesirably influence (e.g., melt) the V structure 108. The electron filter structure 118 may be formed of and include one or more materials facilitating the absorption of electrons. By way of non-limiting example, the electron filter structure 118 may be formed of and include aluminum (Al). If present, the electron filter structure 118 intervenes between the electron deceleration structure 116 and the V structure 108. As shown in FIG. 2, in some embodiments, the electron filter structure 118 is interposed between the electron deceleration structure 116 and each of the electron accelerator 112 and the V structure 108. In additional embodiments, the electron filter structure 118 is interposed between the electron deceleration structure 116 and the V structure 108, but is not interposed between the electron deceleration structure 116 and the electron accelerator 112. A single (e.g., only one) electron filter structure 118 may be provided within the housing structure 110, multiple (e.g., more than one) electron filter structures 118 may be provided within the housing structure 110, or no electron filter structures 118 may be provided within the housing structure 110. If multiple electron filter structures 118 are provided in the housing structure 110, each of the electron filter structures 118 may exhibit substantially the same configuration (e.g., substantially the same material composition, substantially the same dimensions, substantially the same shape, substantially the same orientation, etc.) as each other of the electron filter structures 118, and may be spaced apart from each other of the electron filter structures 118 by substantially the same distance; or one or more of the electron filter structures 118 may exhibit a different configuration (e.g., a different material composition, one or more different dimensions, a different shape, a different orientation, etc.) than one or more other of the electron filter structures 118, or may be may be spaced apart from two of more other of the electron filter structures 118 by different distances.

With continued reference to FIG. 2, if present, the cooling device 120 of the irradiation apparatus 102 may comprise at least one device configured and operated to cool one or more of the V structure 108, the housing structure 110, and the photon generator 114 during use and operation of the irradiation apparatus 102. By way of non-limiting example, if present, the cooling device 120 may comprise a liquid-based cooling device (e.g., a water-based cooling device) at least partially (e.g., substantially) surrounding the housing structure 110 of the irradiation apparatus 102.

During use and operation of the irradiation apparatus 102, electrons are accelerated within the electron accelerator 112 and exit the electron accelerator 112 within one or more electron beam(s) 122 having a nominal electron energy less than or equal to about 44 MeV (e.g., less than or equal to about 34 MeV, less than or equal to about 26 MeV, less than or equal to about 25.5 MeV, less than or equal to about 25 MeV, less than or equal to about 24.5 MeV, within a range of from about 14 MeV to about 44 MeV, within a range of from about 14 MeV to about 26 MeV). The electron beam(s) 122 are directed to the photon generator 114, wherein the accelerated electrons thereof are deflected and decelerated by the electron deceleration structure 116 to generate bremsstrahlung photons. Some electrons may be absorbed by the electron filter structure 118 (if any). The bremsstrahlung photons travel from the photon generator 114 within one or more incident photon beam(s) 124 having an endpoint energy within a range of from about 14 MeV to about 44 MeV (e.g., from about 14 MeV to about 34 MeV, from about 14 MeV to about 26 MeV, from about 14 MeV to about 25.5 MeV, from about 14 MeV to about 25 MeV, from about 14 MeV to about 24.5 MeV). The endpoint energy of the one or more incident photon beam(s) 124 at least partially depends on the nominal electron energy of the one or more electron beam(s) 122 employed to form the one or more incident photon beam(s) 124. The incident photon beams 124 are directed to and irradiate the V structure 108 to effectuate $^{51}V(\gamma,\alpha)^{47}Sc$ reactions, wherein $^{51}V$ of the V structure 108 absorbs gamma ($\gamma$) rays and ejects alpha ($\alpha$) particles to form $^{47}Sc$. Irradiating the V structure 108 with the incident photon beams 124 may also effectuate the production of one or more V isotopes and/or one or more Ti isotopes. However, if the electron beam(s) 122 have a nominal electron energy less than or equal to about 26 MeV (e.g., within a range of from about 14 MeV to about 26 MeV), irradiating the V structure 108 with the incident photon beams 124 of the one or more electron beam(s) 122 may not effectuate the production of $^{46}Sc$ and $^{48}Sc$. Put another way, the $^{47}Sc$-containing structure resulting from irradiating the V structure 108 with the incident photon beams 124 may be free of $^{46}Sc$ and $^{48}Sc$. In additional embodiments, such as those wherein the electron beam(s) 122 have a nominal electron energy greater than about 26 MeV (e.g., within a range of from about 26.6 MeV to about 44 MeV), irradiating the V structure 108 with the incident photon beams 124 of the one or more electron beam(s) 122 may result in a $^{47}Sc$-containing structure including $^{46}Sc$ and/or $^{48}Sc$ in addition to $^{47}Sc$. Employing electron beam(s) 122 having such relatively greater nominal electron energy may, for example, facilitate the production of a relatively greater quantity of $^{47}Sc$, even if at the expense of the production of a relatively greater quantity of $^{46}Sc$ and/or $^{48}Sc$ as well.

Figure 3:
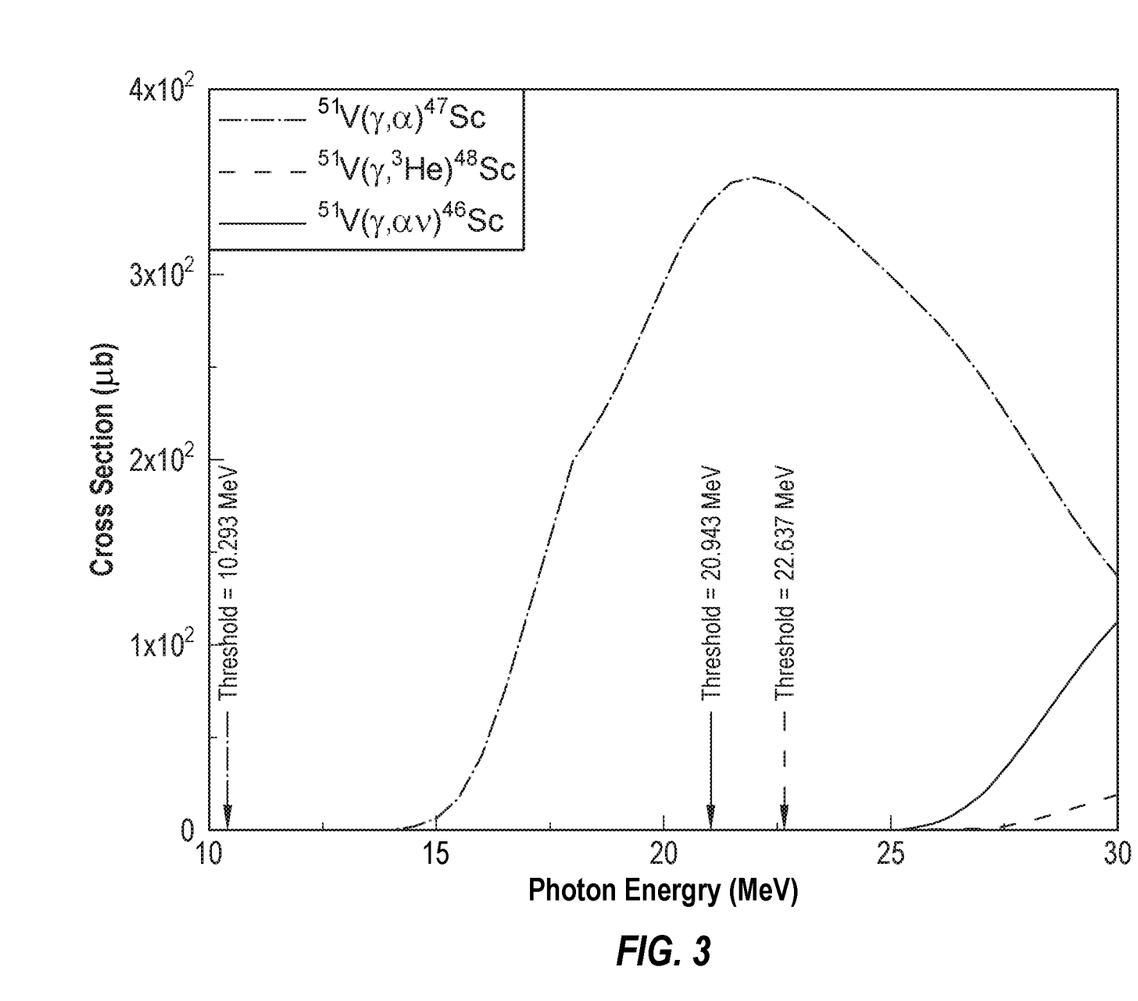
FIG. 3 is graphical representation of nuclear cross sections for different reactions between and $^{51}$V and photon beams having different endpoint energies to produce different Sc isotopes.

FIG. 3 is graphical representation of nuclear cross sections (in microbarns (μb)) for different reactions between and $^{51}V$ and photon beams having different endpoint energies to produce different Sc isotopes (e.g., $^{47}Sc$, $^{48}Sc$, $^{46}Sc$). As shown in FIG. 3, for photon beam endpoint energies within a range of from 14 MeV to about 26 MeV, $^{51}V(\gamma,\alpha)^{47}Sc$ reactions are probable, but $^{51}V(\gamma,^{3}He)^{48}Sc$ reactions (i.e., wherein $^{51}V$ absorbs $\gamma$ rays and ejects $^{3}He$ particles to form $^{48}Sc$) and $^{51}V(\gamma,\alpha n)^{46}Sc$ reactions (i.e., wherein $^{51}V$ absorbs $\gamma$ rays and ejects multiple a particles to form $^{46}Sc$) are improbable. Notably, at photon beam endpoint energies of less than or equal to 25.5 MeV, the probability of $^{51}V(\gamma,^{3}He)^{48}Sc$ reactions is zero; and at photon beam endpoint energies less than or equal to 24.5 MeV the probability of $^{51}V(\gamma,\alpha n)^{46}Sc$ reactions is zero.

With returned reference to FIG. 2, while FIG. 2 depicts a particular configuration of the irradiation apparatus 102, the irradiation apparatus 102 may exhibit a different configuration, such as a configuration exhibiting one or more of different dimensions, a different shape, different features, different feature spacing, different components, and a different arrangement of components. FIG. 2 illustrates just one non-limiting example of an irradiation apparatus 102 for the enriched $^{47}Sc$ production system 100 (FIG. 1). The irradiation apparatus 102 may, for example, exhibit a different configuration of one or more of the V structure 108, the housing structure 110, the electron accelerator 112, and the photon generator 114.

With returned reference to FIG. 1, the dissolution apparatus 104 may comprise at least one device configured to combine the $^{47}Sc$-containing structure formed using the irradiation apparatus 102 with one or more solvents formulated to dissolve the $^{47}Sc$-containing structure. Combining the $^{47}Sc$-containing structure with the solvents may form a $^{47}Sc$-containing solution including the components (e.g., $^{47}Sc$, V isotopes, Ti isotopes) of the $^{47}Sc$-containing structure. The dissolution apparatus 104 may, for example, comprise a device configured to receive and interact the $^{47}Sc$-containing structure and the solvents. By way of non-limiting example, the dissolution apparatus 104 may comprise one or more of a mixing apparatus, a coating apparatus (e.g., spin-coating process, a spray-coating process, an immersion-coating process, a vapor-coating process), and a soaking apparatus.

During use and operation of the dissolution apparatus 104, the $^{47}$Sc-containing structure and the solvent(s) may be provided into the dissolution apparatus 104, and may be interacted with one another for a sufficient period of time (e.g., dissolution time) to substantially dissolve the $^{47}$Sc-containing structure and form the $^{47}$Sc-containing solution. The solvents may, for example, comprise one or more of at least one oxidizing reagent, such as hydrogen peroxide ($H_2O_2$); and at least one mineral acid, such as one or more (e.g., each) of nitric acid ($HNO_3$) and hydrofluoric acid (HF).

In some embodiments, aqueous $HNO_3$ and aqueous HF are combined with the $^{47}$Sc-containing structure. The $HNO_3$ concentration of the aqueous $HNO_3$ may be within a range of from about 4 Molar (M) $HNO_3$ to about 16 M $HNO_3$. In some embodiments, 6 M $HNO_3$ is combined with the $^{46}$Sc-containing structure. The HF concentration of the aqueous HF may be within a range of from about 4 M HF to about 29 M HF. In some embodiments, 6M HF is combined with the $^{47}$Sc-containing structure. The dissolution time using aqueous $HNO_3$ and aqueous HF may at least partially depend on the geometric configuration (e.g., dimensions, shape) of the $^{47}$Sc-containing structure. By way of non-limiting example, the dissolution time using aqueous $HNO_3$ and aqueous HF may be less than or equal to about 10 minutes, such as less than or equal to about 5 minutes, less than or equal to about 4 minutes, less than or equal to about 3 minutes, less than or equal to about 2 minutes, or less than or equal to about 1 minute. In some embodiments, the dissolution time using aqueous $HNO_3$ and aqueous HF is less than or equal to about 4 minutes. In additional embodiments, the dissolution time using aqueous $HNO_3$ and aqueous HF is less than or equal to about 1 minute.

In additional embodiments, aqueous $HNO_3$ and aqueous $H_2O_2$ are combined with the $^{47}$Sc-containing structure. The $HNO_3$ concentration of the aqueous $HNO_3$ may be within a range of from about 4 M $HNO_3$ to about 16 M $HNO_3$. In some embodiments, 6M $HNO_3$ is combined with the $^{47}$Sc-containing structure. The $H_2O_2$ concentration of the aqueous $H_2O_2$ may be within a range of from about 1 percent by volume (vol %) $H_2O_2$ to about 5 vol % $H_2O_2$ to about, such as from about 2 vol % $H_2O_2$ to about 4 vol % $H_2O_2$, or about 3 vol % $H_2O_2$. In some embodiments, 3 vol % $H_2O_2$ is combined with the $^{47}$Sc-containing structure. The dissolution time using aqueous $HNO_3$ and aqueous $H_2O_2$ may at least partially depend on the geometric configuration (e.g., dimensions, shape) of the $^{47}$Sc-containing structure. By way of non-limiting example, the dissolution time using aqueous $HNO_3$ and aqueous $H_2O_2$ may be less than or equal to about 30 minutes, such as less than or equal to about 20 minutes, less than or equal to about 15 minutes, less than or equal to about 10 minutes, or less than or equal to about 5 minutes. In some embodiments, the dissolution time using aqueous $HNO_3$ and aqueous $H_2O_2$ is less than or equal to about 15 minutes.

Optionally, one or more additives may be added to the $^{47}$Sc-containing solution prior to acting upon the $^{47}$Sc-containing solution with the separation apparatus 106. The additives may, for example, enhance separation processes effectuated by the separation apparatus 106. As a non-limiting example, one or more additional mineral acids may be added to the $^{47}$Sc-containing solution to enhance separation of $^{47}$Sc from other components of the $^{47}$Sc-containing solution. In some embodiments, hydrochloric acid (HCl) is added to the $^{47}$Sc-containing solution to enhance uptake of $^{47}$Sc on material (e.g., extraction chromatographic material) employed by the separation apparatus 106. As another non-limiting example, one or more reduction-oxidation reaction (redox) reagents (e.g., hydrogen iodide (HI), ascorbic acid) may be added to the $^{47}$Sc-containing solution to modify vanadium oxidation states, such that less vanadium is retain on material (e.g., extraction chromatographic material) employed by the separation apparatus 106. As yet another non-limiting example, boric acid ($BH_3O_3$) may be added to the $^{47}$Sc-containing solution to remove free fluorine ions ($F^-$) in solution. In additional embodiments, additives are not added to the $^{47}$Sc-containing solution prior to acting upon the $^{47}$Sc-containing solution with the separation apparatus 106.

With continued reference to FIG. 1, the separation apparatus 106 comprises at least one device configured to substantially separate (e.g., isolate) $^{47}$Sc of the $^{47}$Sc-containing solution formed using the dissolution apparatus 104 from the other components of the $^{47}$Sc-containing solution. By way of non-limiting example, the separation apparatus 106 may comprise at least one chromatography column (e.g., at least one gravity fed chromatography column, at least one low pressure chromatography column) including at least one extraction chromatographic material (e.g., resin) formulated to substantially separate the $^{47}$Sc of the $^{47}$Sc-containing solution from other components (e.g., V isotopes, Ti isotopes, etc.) of the $^{47}$Sc-containing solution. The extraction chromatographic material may retain the $^{47}$Sc of the $^{47}$Sc-containing solution without substantially retaining other components of the $^{47}$Sc-containing solution, or may retain other components of the $^{47}$Sc-containing solution without substantially retaining the $^{47}$Sc of the $^{47}$Sc-containing solution. In some embodiments, the separation apparatus 106 comprises at least one chromatography column including an extraction chromatographic material comprising octylphenyl-N,N-di-isobutyl carbamoylphosphine oxide (CMPO) dissolved in tri-n-butyl phosphate (TBP). Such an extraction chromatographic material is commercially available from Eichrom Technologies, Inc. of Lisle, Ill. under the TRU Resin trade name and the RE Resin trade name. In additional embodiments, the separation apparatus 106 comprises at least one chromatography column including an extraction chromatographic material comprising diamyl amylphosphonate (DAAP). Such an extraction chromatographic material is commercially available from Eichrom Technologies, Inc. of Lisle, Ill. under the UTEVA® Resin trade name. In further embodiments, the separation apparatus 106 comprises at least one chromatography column including an extraction chromatographic material comprising N,N,N',N'-tetra-2-ethylhexyldiglycolamide (branched-DGA, B-DGA). Such an extraction chromatographic material is commercially available from Eichrom Technologies, Inc. of Lisle, Ill. under the DGA Resin trade name.

In embodiments wherein separation apparatus 106 comprises a chromatography column, the $^{47}$Sc-containing solution may be provided (e.g., gravity fed; pumped, such as peristaltic pumped) into the separation apparatus 106. Within the chromatography column, at least partially depending on the material compositions of the $^{47}$Sc-containing solution and the extraction chromatographic material, either $^{47}$Sc of the $^{47}$Sc-containing solution is retained on the extraction chromatographic material, or other components of the $^{47}$Sc-containing solution are retained on the extraction chromatographic material.

In some embodiments, the $^{47}$Sc-containing solution includes $HNO_3$ (e.g., 6 M $HNO_3$) and HF (e.g., 6M HF) (and, optionally, HCl), the extraction chromatographic material comprises CMPO dissolved in TBP (e.g., TRU Resin or RE Resin), and $^{47}$Sc is retained on the extraction chromatographic material. Components of the $^{47}$Sc-containing solution not retained on the extraction chromatographic material (e.g., V, Ti, HNO$_3$, HF, HCl (if any), etc.) are removed from the chromatography column as an effluent stream. The chromatography column may then be rinsed with additional acid (e.g., additional HNO$_3$, such as additional 6 M HNO$_3$, and/or relatively more dilute HNO$_3$, such as 3 M HNO$_3$), and then the chromatography column may be treated with relatively dilute acid (e.g., relatively more dilute HNO$_3$, such as 0.1 M HNO$_3$; relatively dilute HCl, such a 0.01 M HCl) to elute retained material (e.g., $^{47}$Sc) of the $^{47}$Sc-containing solution from the extraction chromatographic material.

In additional embodiments, the $^{47}$Sc-containing solution includes HNO$_3$ (e.g., 6 M HNO$_3$) and H$_2$O$_2$ (e.g., 3 vol % H$_2$O$_2$) (and, optionally, HCl), the extraction chromatographic material comprises branched-DGA (e.g., DGA Resin), and $^{47}$Sc is retained on the extraction chromatographic material. Components of the $^{47}$Sc-containing solution not retained on the extraction chromatographic material (e.g., V, Ti, HNO$_3$, H$_2$O$_2$, HCl (if any), etc.) are removed from the chromatography column as an effluent stream. Thereafter, the chromatography column may be rinsed with additional acid (e.g., additional HNO$_3$, such as additional 6 M HNO$_3$; and/or relatively more dilute HNO$_3$, such as 3 M HNO$_3$), and then the chromatography column may be treated with relatively dilute acid (e.g., relatively dilute HCl, such a 0.01 M HCl) to elute retained material (e.g., $^{47}$Sc) of the $^{47}$Sc-containing solution from the extraction chromatographic material.

Figure 4:
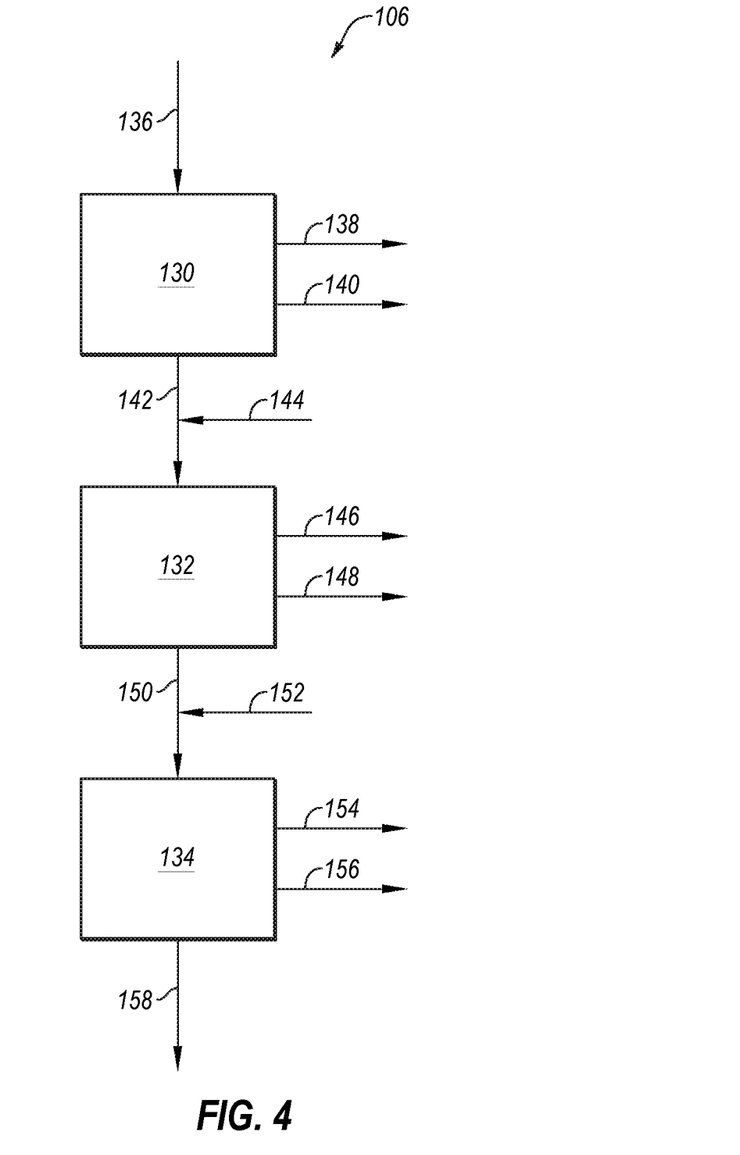
FIG. 4 is a schematic block diagram illustrating a separation apparatus configuration for the enriched $^{47}$Sc production system shown in FIG. 1, in accordance with an embodiment of the disclosure.

In some embodiments, the at least one separation apparatus 106 includes multiple (e.g., more than one) chromatography columns in series with one another. The separation apparatus 106 may, for example, include two (2) or more (e.g., three (3) or more) chromatography columns in series with one another. As a non-limiting example, FIG. 4 is a schematic block diagram illustrating a configuration of the at least one separation apparatus 106 of the enriched $^{47}$Sc production system 100 shown in FIG. 1, in accordance with embodiments of the disclosure. As shown in FIG. 4, the at least one separation apparatus 106 may include a first chromatography column 130, a second chromatography column 132, and a third chromatography column 134 in series with one another and in fluid communication with one another. The second chromatography column 132 may be positioned downstream of the first chromatography column 130, and the third chromatography column 134 may be positioned downstream of the second chromatography column 132.

With continued reference to FIG. 4, during use and operation of the enriched $^{47}$Sc production system 100 (FIG. 1) the first chromatography column 130 may receive a first stream 136 including a $^{47}$Sc-containing solution produced by the dissolution apparatus 104 (FIG. 1), and may produce a first product stream 142 including $^{47}$Sc. In some embodiments, the first chromatography column 130 also produces a first effluent stream 138 including other components (e.g., V isotopes, Ti isotopes, solvent(s), etc.) of the first stream 136, and a first effluent rinse stream 140. By way of non-limiting example, a first chromatography column 130 including an extraction chromatographic material comprising branched-DGA may receive a $^{47}$Sc-containing solution produced by the dissolution apparatus 104 (FIG. 1) as the first stream 136. The first chromatography column 130 may retain $^{47}$Sc of the $^{47}$Sc-containing solution on the extraction chromatographic material thereof, and at least a portion of other components (e.g., HNO$_3$, H$_2$O$_2$, V isotopes, Ti isotopes) of the first stream 136 may exit the first chromatography column 130 as the first effluent stream 138. An additional amount of aqueous HNO$_3$ (e.g., 6 M HNO$_3$) may be delivered to the first chromatography column 130 following the receipt of the first stream 136 to promote or effectuate the formation and exit of the first effluent stream 138. The extraction chromatographic material of the first chromatography column 130 may then be rinsed with relatively more dilute HNO$_3$ (e.g., 3 M HNO$_3$), which may then exit the first chromatography column 130 as the first effluent rinse stream 140. The extraction chromatographic material of the first chromatography column 130 may then be treated with aqueous HCl (e.g., 0.01 M HCl) to elute retained material (e.g., $^{47}$Sc) of the first stream 136 therefrom and form the first product stream 142.

Next, the first product stream 142 exiting the first chromatography column 130 may be combined with a first supplemental solvent stream 144 including additional solvent(s) (e.g., additional HNO$_3$) for dissolving $^{47}$Sc, and may be directed into the second chromatography column 132. The second chromatography column 132 may, in turn, produce a second product stream 150 including $^{47}$Sc. The second product stream 150 may be relatively rich in $^{47}$Sc and relatively lean in other components (e.g., V isotopes, Ti isotopes, etc.) of the $^{47}$Sc-containing solution of the first stream 136 as compared to the first product stream 142. The second chromatography column 132 may also produce a second effluent stream 146 including other components (e.g., V isotopes, Ti isotopes, solvent(s), etc.) of the first product stream 142 and the first supplemental solvent stream 144, and a second effluent rinse stream 148. By way of non-limiting example, the first product stream 142 may be combined with a first supplemental solvent stream 144 including HNO$_3$ (e.g., 16 M HNO$_3$) and the resulting composition may be directed into a second chromatography column 132 including an extraction chromatographic material comprising branched-DGA. The second chromatography column 132 may retain $^{47}$Sc of the first product stream 142 on the extraction chromatographic material thereof, and at least a portion of other components (e.g., HNO$_3$, HCl, V isotopes, Ti isotopes) of the first product stream 142 may exit the second chromatography column 132 as the second effluent stream 146. An additional amount of aqueous HNO$_3$ (e.g., 6 M HNO$_3$) may be delivered to the second chromatography column 132 following the receipt of the first product stream 142 to promote or effectuate the formation and exit of the second effluent stream 146. The extraction chromatographic material of the second chromatography column 132 may then be rinsed with relatively more dilute HNO$_3$ (e.g., 3 M HNO$_3$), which may then exit the second chromatography column 132 as the second effluent rinse stream 148. The extraction chromatographic material of the second chromatography column 132 may then be treated with aqueous HCl (e.g., 0.01 M HCl) to elute retained material (e.g., $^{47}$Sc) of the first product stream 142 therefrom and form the second product stream 150.

Next, the second product stream 150 exiting the second chromatography column 132 may be combined with a second supplemental solvent stream 152 including further solvent(s) (e.g., further HNO$_3$) for dissolving $^{47}$Sc, and may be directed into the third chromatography column 134. The third chromatography column 134 may, in turn, produce a third product stream 158 including $^{47}$Sc. The third product stream 158 may be relatively rich in $^{47}$Sc and relatively lean in other components (e.g., V isotopes, Ti isotopes, etc.) of the $^{47}$Sc-containing solution of the first stream 136 as compared to the second product stream 150. The third chromatography column 134 may also produce a third effluent stream 154 including other components (e.g., V isotopes, Ti isotopes, solvent(s), etc.) of the second product stream 150 and the second supplemental solvent stream 152, and a third effluent rinse stream 156. By way of non-limiting example, the second product stream 150 may be combined with a second supplemental solvent stream 152 including HNO$_3$ (e.g., 16 M HNO$_3$) and the resulting composition may be directed into a third chromatography column 134 including an extraction chromatographic material comprising branched-DGA. The third chromatography column 134 may retain $^{47}$Sc of the second product stream 150 on the extraction chromatographic material thereof, and at least a portion of other components (e.g., HNO$_3$, HCl, V isotopes, Ti isotopes) of the second product stream 150 may exit the third chromatography column 134 as the third effluent stream 154. An additional amount of aqueous HNO$_3$ (e.g., 6 M HNO$_3$) may be delivered to the third chromatography column 134 following the receipt of the second product stream 150 to promote or effectuate the formation and exit of the third effluent stream 154. Thereafter, the extraction chromatographic material of the third chromatography column 134 may be rinsed with relatively more dilute HNO$_3$ (e.g., 3 M HNO$_3$), which may then exit the third chromatography column 134 as the third effluent rinse stream 156. The extraction chromatographic material of the third chromatography column 134 may then be treated with aqueous HCl (e.g., 0.01 M HCl) to elute retained material (e.g., $^{47}$Sc) of the second product stream 150 therefrom and form the third product stream 158. The methods, systems, and apparatuses of the disclosure facilitate the efficient production of enriched $^{47}$Sc. For example, the methods, systems, and apparatuses of the disclosure facilitate the simple, cost effective production of $^{47}$Sc from readily available V sources (e.g., natural, unenriched V sources) through $^{51}$V($\gamma$,$\alpha$)$^{47}$Sc reactions, without the simultaneous production of undesirable Sc radioisotopes (e.g., $^{46}$Sc, $^{48}$Sc). In addition, the methods, systems, and apparatuses of the disclosure facilitate the rapid and highly efficient separation and purification of the produced $^{47}$Sc from additional, undesired materials (e.g., V isotopes, Ti isotopes). The methods, systems, and apparatuses of the disclosure may streamline the production of $^{47}$Sc/$^{44}$Sc radionuclide pairs that may be used to simultaneously image and treat cancerous growths.

The following examples serve to explain embodiments of the disclosure in more detail. These examples are not to be construed as being exhaustive, exclusive, or otherwise limiting as to the scope of the disclosure.

EXAMPLES

Figure 5:
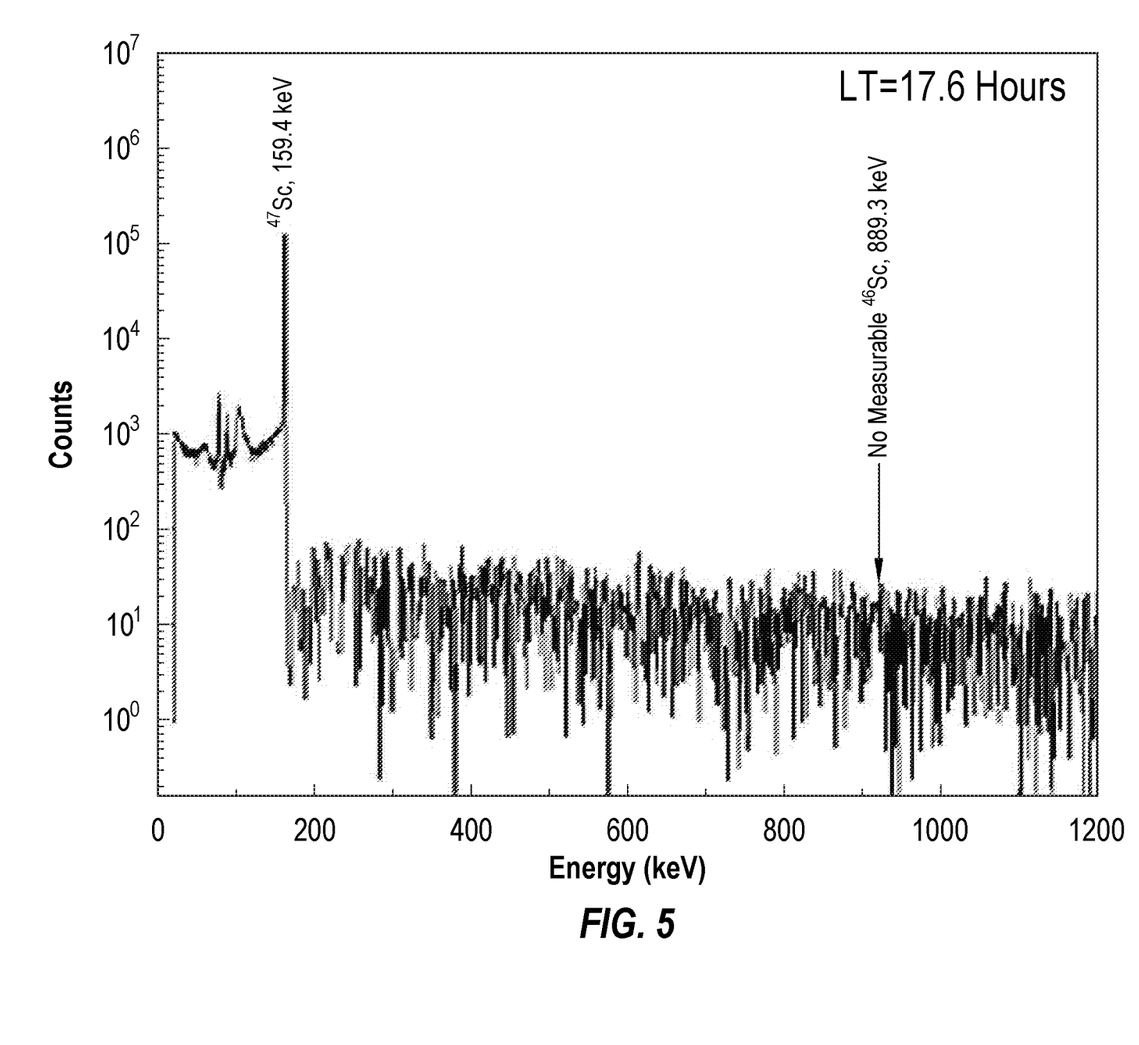
FIG. 5 is a gamma ray spectrum showing the results of the analysis described in Example 1.

Example 1: $^{47}$Sc Production Through $^{51}$V($\gamma$,$\alpha$)$^{47}$Sc Reactions The photonuclear production of $^{47}$Sc through $^{51}$V($\gamma$,$\alpha$) $^{47}$Sc reactions was evaluated. An electron beam having a nominal energy level of 26 MeV±0.5 MeV was generated using a linear particle accelerator. The electron beam was directed toward a W foil to generate an incident beam of bremsstrahlung photons having an endpoint energy of 26 MeV±0.5 MeV. A foil of natural V (99.75 wt % $^{51}$V) was then irradiated with the incident photon beam, and the resulting irradiated foil was analyzed using a high purity germanium (HPGe) radiation detector. FIG. 5 is a gamma ray spectrum showing the results of the analysis. As shown in FIG. 5, the irradiated foil included $^{47}$Sc, but was free of $^{46}$Sc.

Example 2: Sc Isolation from V and Ti

Figure 6:
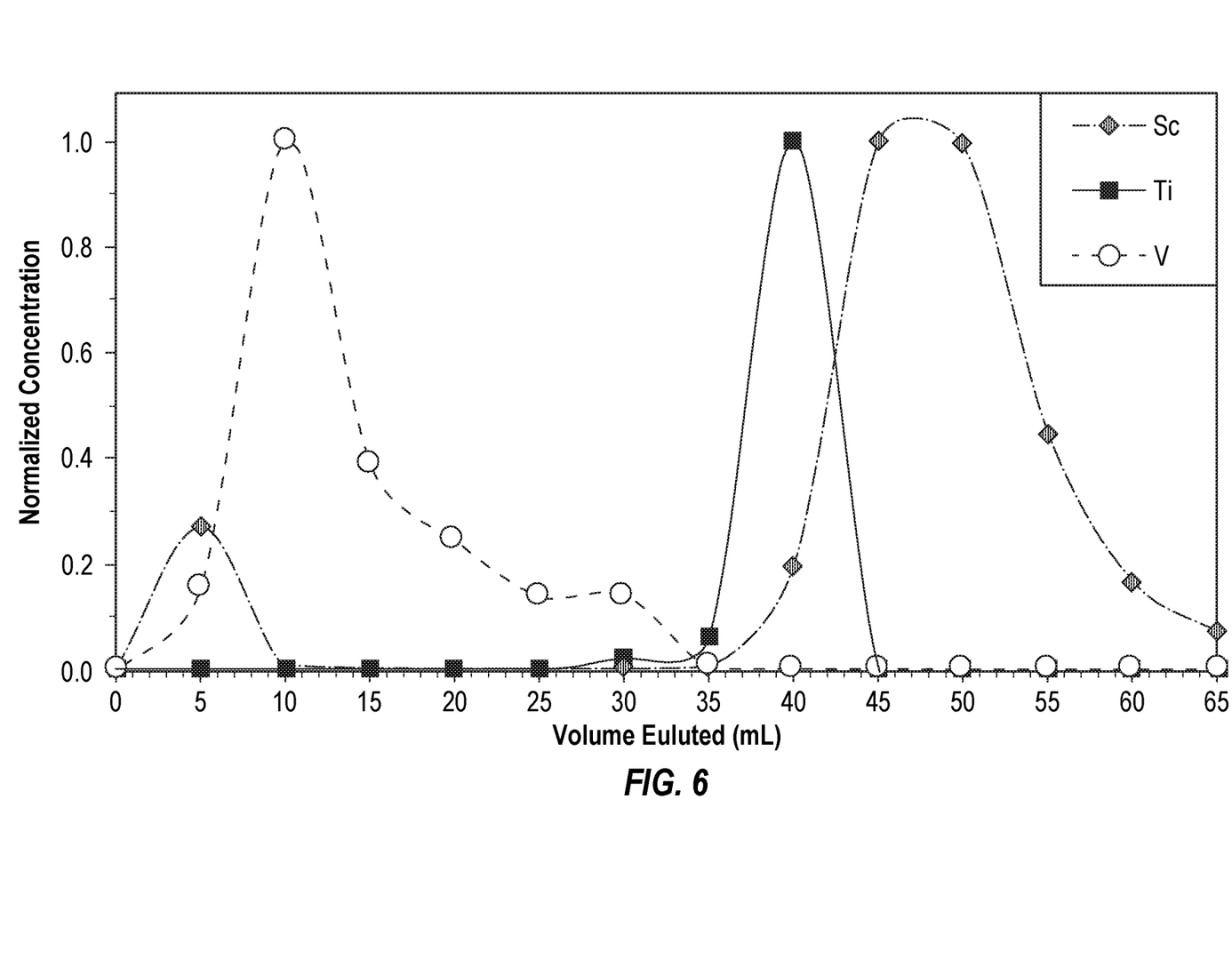
FIG. 6 is a graphical representation showing the results of the analysis described in Example 2.

The separation of Sc from V and Ti using a chromatography column including TRU Resin (Eichrom Technologies, Inc. of Lisle, Ill.) was evaluated. An Sc-containing solution including Sc, V, and Ti dissolved in 6M HNO$_3$+HF was loaded into the chromatography column. 6 M HNO$_3$ was then added to the chromatography column to remove V and Ti from the chromatography column. Thereafter 0.1 M HNO$_3$ was added to the chromatography column to elute Sc from the chromatography column. FIG. 6 is a graphical representation showing the results of the chromatography process. As shown in FIG. 6, the chromatography process was successful at separating Sc from V and Ti.

Example 3: Sc Isolation from V and Ti

Figure 7:
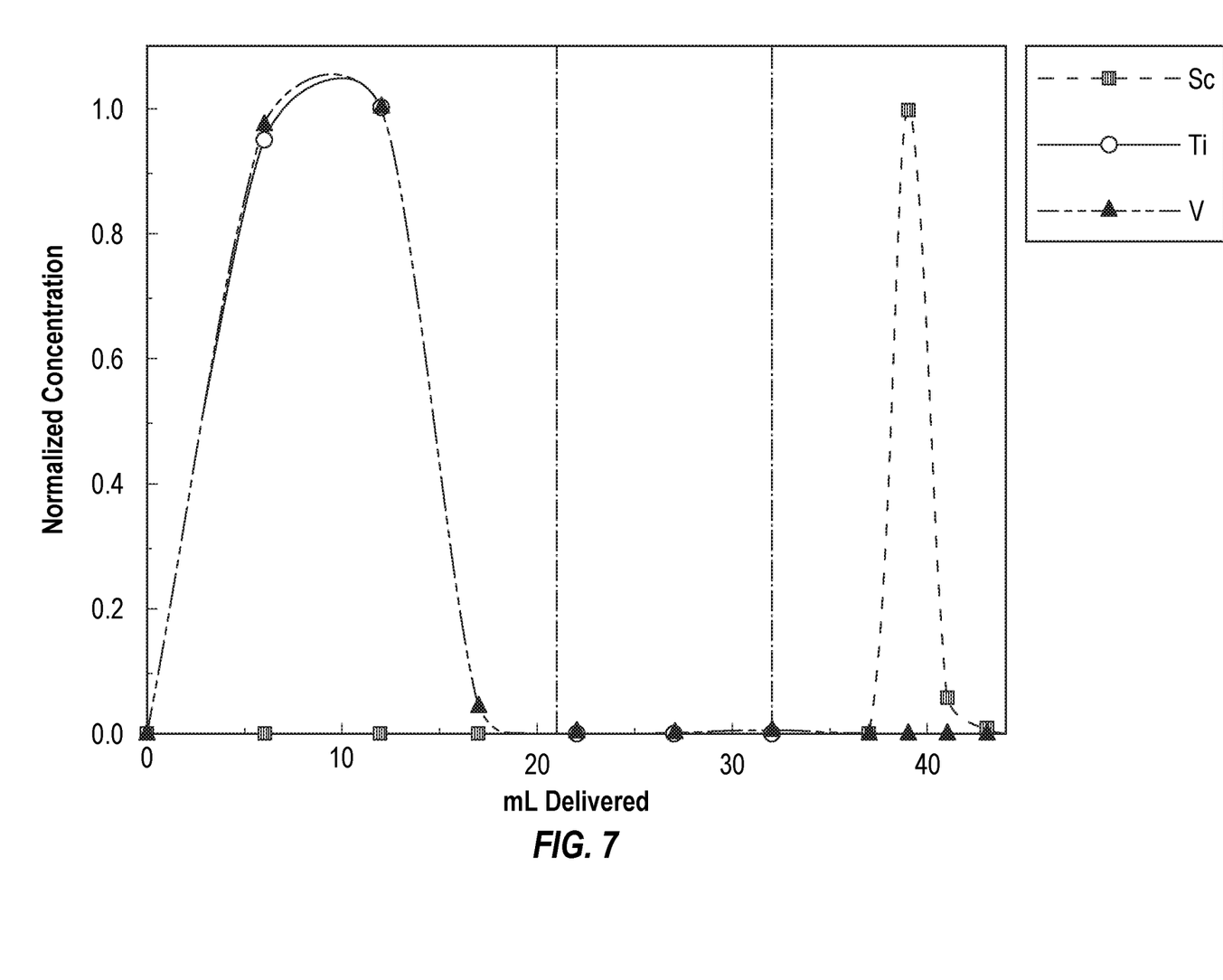
FIG. 7 is a graphical representation showing the results of the analysis described in Example 3.

The separation of Sc from V and Ti using a chromatography column including branched-DGA Resin (Eichrom Technologies, Inc. of Lisle, Ill.) was evaluated. An Sc-containing solution including Sc, V, and Ti dissolved in 6M HNO$_3$+3 vol % H$_2$O$_2$ was loaded into the chromatography column. 6 M HNO$_3$ was then added to the chromatography column to remove V and Ti from the chromatography column. The chromatography column was then rinsed with 3 M HNO$_3$. Thereafter 0.01 M HCl was added to the chromatography column to elute Sc from the chromatography column. FIG. 7 is a graphical representation showing the results of the chromatography process. As shown in FIG. 7, the chromatography process was successful at separating Sc from V and Ti.

Additional, non-limiting example embodiments of the disclosure are described below.

Embodiment 1: A method of producing enriched $^{47}$Sc, comprising: irradiating a V structure comprising $^{51}$V with at least one incident photon beam having an endpoint energy within a range of from about 14 MeV to about 44 MeV to convert at least some of the $^{51}$V to $^{47}$Sc and form a $^{47}$Sc-containing structure; and separating the $^{47}$Sc of the $^{47}$Sc-containing structure from additional components of the $^{47}$Sc-containing structure using a chromatography process.

Embodiment 2: The method of Embodiment 1, wherein irradiating a V structure comprising $^{51}$V comprises: generating at least one electron beam having a nominal energy level substantially equal to the endpoint energy of the incident photon beam; and treating an electron deceleration structure with the at least one electron beam to generate bremsstrahlung photons that form the at least one incident photon beam.

Embodiment 3: The method of Embodiment 2, wherein generating at least one electron beam comprises accelerating electrons in a linear particle accelerator.

Embodiment 4: The method of one of Embodiments 2 and 3, wherein treating an electron deceleration structure with the at least one electron beam comprises treating at least one of a W structure, a Ta structures, and a Cu structure with the at least one electron beam.

Embodiment 5: The method of any one of Embodiments 2 through 4, further comprising absorbing electrons deflected and decelerated by the electron deceleration structure with at least one electron filter structure interposed between the electron deceleration structure and the V structure.

Embodiment 6: The method of any one of Embodiments 1 through 5, further comprising selecting the endpoint energy of the at least one incident photon beam to be less than or equal to about 24.5 MeV.

Embodiment 7: The method of any one of Embodiments 1 through 6, wherein separating the $^{47}$Sc of the 47Sc-containing structure from additional components of the $^{47}$Sc-containing structure comprises isolating the $^{47}$Sc from substantially all other isotopes of the $^{47}$Sc-containing structure.

Embodiment 8: The method of any one of Embodiments 1 through 7, wherein separating the $^{47}$Sc of the $^{47}$Sc-containing structure from additional components of the $^{47}$Sc-containing structure comprise: dissolving the $^{47}$Sc-containing structure to form an $^{47}$Sc-containing solution comprising the $^{47}$Sc and the additional components; and separating the $^{47}$Sc of the $^{47}$Sc-containing solution from the additional components using at least one chromatography column comprising an extraction chromatographic material formulated to retain one of the $^{47}$Sc and the additional components relative to the other of the $^{47}$Sc and the additional components.

Embodiment 9: The method of Embodiment 8, wherein dissolving the $^{47}$Sc-containing structure comprises treating the $^{47}$Sc-containing structure with $HNO_3$ and one of HF and $H_2O_2$.

Embodiment 10: The method of one of Embodiments 8 and 9, wherein separating the $^{47}$Sc of the $^{47}$Sc-containing solution from the additional components using at least one chromatography column comprises: delivering the $^{47}$Sc-containing solution into a first chromatography column; rinsing the first chromatography column with a first mineral acid after delivering the $^{47}$Sc-containing solution into the chromatography column; and treating the first chromatography column with a second mineral acid dilute relative to the first mineral acid after rinsing the chromatography column with the first mineral acid.

Embodiment 11: The method of any one of Embodiments 8 through 10, further comprising selecting the extraction chromatographic material to comprise one of octylphenyl-N,N-di-isobutyl carbamoylphosphine oxide dissolved in tri-n-butyl phosphate, diamyl amylphosphonate, and N,N,N'N'-tetra-2-ethylhexyldiglycolamide.

Embodiment 12: The method of any one of Embodiments 8 through 11, further comprising adding one or more of hydrochloric acid, an reduction-oxidation reaction reagent, and boric acid to the $^{47}$Sc-containing solution.

Embodiment 13: A system for producing enriched $^{47}$Sc, comprising: an irradiation apparatus comprising: an electron accelerator configured to generate an electron beam having a nominal electron energy less than or equal to about 44 MeV; and a photon generator configured and positioned to receive the electron beam and to generate an incident proton beam having an endpoint energy substantially equal to the nominal energy level of the electron beam; a V structure configured and positioned to receive the incident proton beam to produce a $^{47}$Sc-containing structure through $^{51}$V($\gamma$, $\alpha$)$^{47}$Sc reactions; a dissolution apparatus configured and positioned to receive and interact the $^{47}$Sc-containing structure with one or more solvents formulated to dissolve the $^{47}$Sc-containing structure to form an $^{47}$Sc-containing solution; and a separation apparatus configured and positioned to receive the $^{47}$Sc-containing solution and to substantially separate $^{47}$Sc of the $^{47}$Sc-containing solution from other components of the $^{47}$Sc-containing solution.

Embodiment 14: The system of Embodiment 13, wherein the electron accelerator of the irradiation apparatus comprises a linear particle accelerator.

Embodiment 15: The system of one of Embodiments 13 and 14, wherein the photon generator of the irradiation apparatus comprises: an electron deceleration structure configured and positioned to deflect and decelerate electrons of the electron beam to generate bremsstrahlung photons; and an electron filter structure configured and positioned to absorb the electrons deflected and decelerated by the electron deceleration structure.

Embodiment 16: The system of any one of Embodiments 13 through 15, further comprising a cooling apparatus configured and positioned to cool one or more of the V structure and the photon generator of the irradiation apparatus.

Embodiment 17: The system of any one of Embodiments 13 through 16, wherein the separation apparatus comprises at least one chromatography column comprising an extraction chromatographic material formulated to separate $^{47}$Sc of the $^{47}$Sc-containing solution from the other components of the $^{47}$Sc-containing solution.

Embodiment 18: The system of any one of Embodiments 13 through 17, wherein the extraction chromatographic material comprises one of diamyl amylphosphonate, octylphenyl-N,N-di-isobutyl carbamoylphosphine oxide dissolved in tri-n-butyl phosphate, and N,N,N'N'-tetra-2-ethylhexyldiglycolamide.

Embodiment 19: The system of any one of Embodiments 13 through 18, wherein the at least one chromatography column comprises multiple chromatography columns in series with one another.

Embodiment 20: An apparatus, comprising: an electron accelerator configured to generate an electron beam having a nominal energy level less than or equal to about 44 MeV; a photon generator comprising an electron deceleration structure configured and positioned to receive the electron beam and to generate an incident bremsstrahlung proton beam having an endpoint energy within a range of from about 14 MeV to about 44 MeV; and a V structure configured and positioned to receive the incident bremsstrahlung proton beam and to produce a $^{47}$Sc-containing structure through $^{51}$V($\gamma$,$\alpha$)$^{47}$Sc reactions.

While the disclosure is susceptible to various modifications and alternative forms, specific embodiments have been shown by way of example in the drawings and have been described in detail herein. However, the disclosure is not limited to the particular forms disclosed. Rather, the disclosure is to cover all modifications, equivalents, and alternatives falling within the scope of the following accompanying claims and their legal equivalent. For example, elements and features disclosed in relation to one embodiment may be combined with elements and features disclosed in relation to other embodiments of the disclosure.

What is claimed is:

1. A method of producing enriched $^{47}$Sc, comprising:
    irradiating a V structure comprising $^{51}$V with at least one incident photon beam having an endpoint energy within a range of from about 14 MeV to about 44 MeV to convert at least some of the $^{51}$V to $^{47}$Sc and form a $^{47}$Sc-containing structure; and
    separating the $^{47}$Sc of the $^{47}$Sc-containing structure from additional components of the $^{47}$Sc -containing structure using a chromatography process.

2. The method of claim 1, wherein irradiating a V structure comprising $^{51}$V comprises:

generating at least one electron beam having a nominal energy level substantially equal to the endpoint energy of the incident photon beam; and treating an electron deceleration structure with the at least one electron beam to generate bremsstrahlung photons that form the at least one incident photon beam.

3. The method of claim 2, wherein generating at least one electron beam comprises accelerating electrons in a linear particle accelerator.

4. The method of claim 2, wherein treating an electron deceleration structure with the at least one electron beam comprises treating at least one of a W structure, a Ta structures, and a Cu structure with the at least one electron beam.

5. The method of claim 2, further comprising absorbing electrons deflected and decelerated by the electron deceleration structure with at least one electron filter structure interposed between the electron deceleration structure and the V structure.

6. The method of claim 1, further comprising selecting the endpoint energy of the at least one incident photon beam to be less than or equal to about 24.5 MeV.

7. The method of claim 1, wherein separating the $^{47}$Sc of the $^{47}$Sc-containing structure from additional components of the $^{47}$Sc-containing structure comprises isolating the $^{47}$Sc from substantially all other isotopes of the $^{47}$Sc-containing structure.

8. The method of claim 1, wherein separating the $^{47}$Sc of the $^{47}$Sc-containing structure from additional components of the $^{47}$Sc-containing structure comprises:

dissolving the $^{47}$Sc-containing structure to form an $^{47}$Sc-containing solution comprising the $^{47}$Sc and the additional components; and separating the $^{47}$Sc of the $^{47}$Sc-containing solution from the additional components using at least one chromatography column comprising an extraction chromatographic material formulated to retain one of the $^{47}$Sc and the additional components relative to the other of the $^{47}$Sc and the additional components.

9. The method of claim 8, wherein dissolving the $^{47}$Sc-containing structure comprises treating the $^{47}$Sc-containing structure with $HNO_3$ and one of HF and $H_2O_2$.

10. The method of claim 8, wherein separating the $^{47}$Sc of the $^{47}$Sc -containing solution from the additional components using at least one chromatography column comprises:

delivering the $^{47}$Sc-containing solution into a first chromatography column;

rinsing the first chromatography column with a first mineral acid after delivering the $^{47}$Sc -containing solution into the chromatography column; and treating the first chromatography column with a second mineral acid dilute relative to the first mineral acid after rinsing the chromatography column with the first mineral acid.

11. The method of claim 8, further comprising selecting the extraction chromatographic material to comprise one of octylphenyl-N,N-di-isobutyl carbamoylphosphine oxide dissolved in tri-n-butyl phosphate, diamyl amylphosphonate, and N,N,N',N'-tetra-2-ethylhexyldiglycolamide.

12. The method of claim 8, further comprising adding one or more of hydrochloric acid, an reduction-oxidation reaction reagent, and boric acid to the $^{47}$Sc-containing solution.

* * * * *

UNITED STATES PATENT AND TRADEMARK OFFICE
CERTIFICATE OF CORRECTION

PATENT NO. : 11,501,890 B2
APPLICATION NO. : 17/594995
DATED : November 15, 2022
INVENTOR(S) : Mathew S. Snow and Mathew T. Kinlaw Page 1 of 1

It is certified that error appears in the above-identified patent and that said Letters Patent is hereby corrected as shown below:

In the Specification

| | | | |
|---|---|---|---|
| | Column 5, | Line 31, | change "scandium 46 ($^{46}$Sc))" to --scandium 46 ($^{46}$Sc)-- |
| | Column 6, | Line 6, | change "maximize)$^{47}$Sc" to --maximize) $^{47}$Sc-- |
| | Column 8, | Line 35, | change "multiple a particles" to --multiple α particles-- |
| | Column 9, | Lines 18-19, | change "the $^{46}$Sc-containing" to --the $^{47}$Sc-containing-- |
| | Column 10, | Line 17, | change "isolate)$^{47}$Sc of" to --isolate) $^{47}$Sc of-- |
| | Column 10, | Line 39, | change "of Lisle, Ill. under" to --of Lisle, IL under-- |
| | Column 10, | Line 46, | change "of Lisle, Ill. under" to --of Lisle, IL under-- |
| | Column 10, | Line 52, | change "of Lisle, Ill. under" to --of Lisle, IL under-- |
| | Column 14, | Line 9, | change "of Lisle, Ill.) was" to --of Lisle, IL) was-- |
| | Column 14, | Line 24, | change "of Lisle, Ill.) was" to --of Lisle, IL) was-- |

In the Claims

| | | | |
|---|---|---|---|
| Claim 1, | Column 16, | Line 64, | change "the $^{47}$Sc -containing" to --the $^{47}$Sc-containing-- |
| Claim 7, | Column 17, | Line 23, | change "the $^{47}$Sc-containing" to --the $^{47}$Sc-containing-- |
| Claim 10, | Column 18, | Line 11, | change "the $^{47}$Sc -containing" to --the $^{47}$Sc-containing-- |
| Claim 10, | Column 18, | Line 16, | change "the $^{47}$Sc -containing" to --the $^{47}$Sc-containing-- |

Signed and Sealed this
Fourth Day of July, 2023

Katherine Kelly Vidal
*Director of the United States Patent and Trademark Office*